United States Patent

[11] 3,584,435

| [72] | Inventors | Halvor Grasvoll<br>Goteborg;<br>Goran Herbert Hansson, Torslanda, both of, Sweden |
|---|---|---|
| [21] | Appl. No. | 857,959 |
| [22] | Filed | Sept. 15, 1969 |
| [45] | Patented | June 15, 1971 |
| [73] | Assignees | Gustav Gilbert Magnusson,<br>Vastra Frolunda, Sweden;<br>Karl Ingvar Weiner<br>Goteborg, both of, Sweden |
| [32] | Priority | Sept. 17, 1968 |
| [33] | | Sweden |
| [31] | | 12492/68 |

[54] MACHINE FOR WRAPPING PALLET LOADS IN SHRINK FILMS
6 Claims, 15 Drawing Figs.

[52] U.S. Cl. ............................................. 53/184,
53/182
[51] Int. Cl. ............................................. B65b 41/12,
B65b 45/00, B65b 53/02
[50] Field of Search ............................................. 53/28, 30,
33, 182, 189, 180

[56] References Cited
UNITED STATES PATENTS

| 3,303,630 | 2/1967 | Harm | 53/28 |
| 3,336,727 | 8/1967 | Lattke | 53/184 UX |
| 3,347,015 | 10/1967 | Nutting et al. | 53/182 |

Primary Examiner—Theron E. Condon
Assistant Examiner—E. F. Desmond
Attorney—Kane, Dalsimer, Kane and Kurucz ABSTRACT: The present invention relates to a machine for wrapping pallet loads in shrinkable sheeting, provided with a gantry having a conveyor travelling therethrough for conveying through the said gantry loads resting on load pallets, a device for feeding shrinkable sheeting from a supply roll in the longitudinal direction of the conveyor, elements for welding together and severing the shrinkable sheeting material through the welding position and in the longitudinal direction thereof, and with a heated shrinking tunnel with a conveyor for conveying the load covered with shrinkable sheeting, and its associated load pallet, through the shrinking tunnel in order to shrink the sheeting laid about the load. One object of the invention is to provide, in a continuous manner, loads passing through the machine with covers of shrinkable sheeting surrounding the loads and the sides of the pallets in sealing-tight manner such that the pallet is effectively protected from rain. This has been achieved thereby that the shrinkable sheeting feed device supplies the shrinkable sheeting in a sliding manner on a guide arrangement for the shrinkable sheeting which is connected to the gantry and extends in the direction of advance of the conveyor, and that the elements for welding together and severing the web of shrinkable sheeting sliding over this guide arrangement and hanging downwards with its side portion from this arrangement, press against one another the portions of the said web which hang downwards at both sides before the welding and severing operation is carried out.

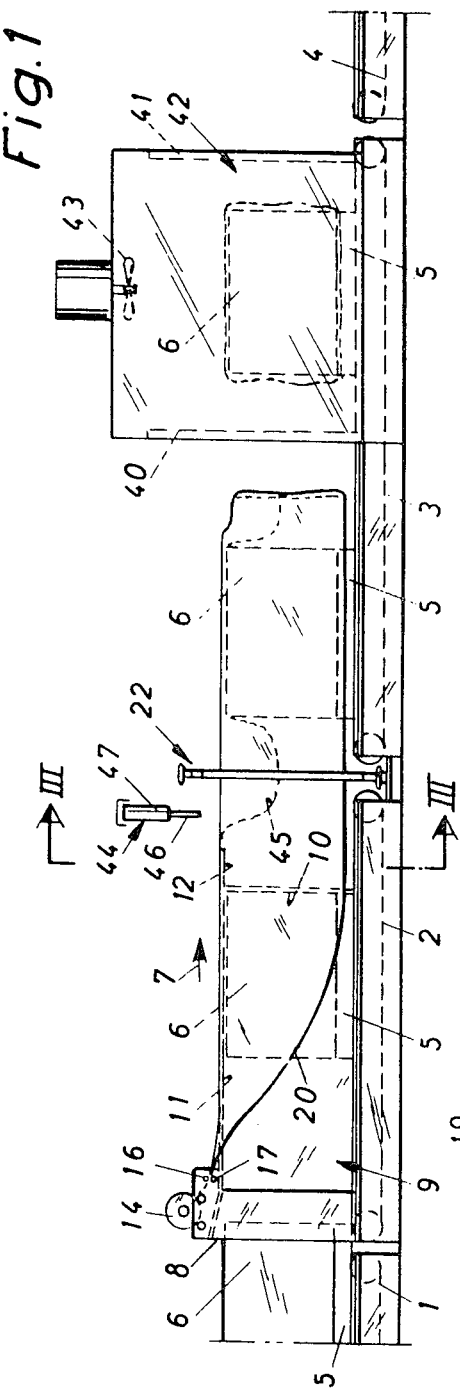
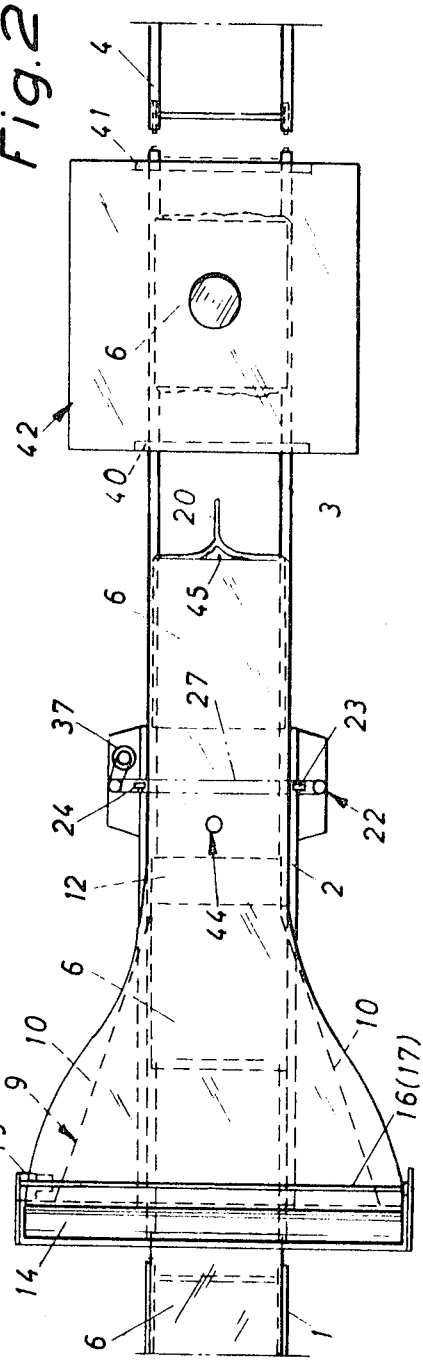

INVENTORS
HALVOR GRÅSVOLL
GÖRAN HERBERT HANSSON
BY
Kane, Dalsimer, Kane, Sullivan & Kurucz
ATTORNEYS

MACHINE FOR WRAPPING PALLET LOADS IN SHRINK FILMS

BRIEF DESCRIPTION OF THE INVENTION

The present invention concerns a machine whereby it is possible for loads (also referred to as "pallet loads" hereinafter) which are conveyed continuously through the machine resting on load pallets, to be provided with a cover consisting of shrinkable sheeting which surrounds both the load and the sides of the pallet in sealing-tight manner. As a result, the load standing on the pallet is effectively protected from rain. More specifically, the present invention relates to wrapping machines which are provided with a gantry with a conveyor travelling therethrough for the conveyance of loads resting on pallets through the said gantry, a device for supplying shrinkable sheeting from a supply roll in the longitudinal direction of the conveyor, elements for welding together and severing the shrinkable sheeting material through the welded zone and in the longitudinal direction thereof, and also with a heated shrinking tunnel with a conveyor for conveying the load covered with shrinkable sheeting and the pallet associated with the said load through the shrinking tunnel in order to shrink the sheeting arranged about the load.

The invention is characterized in that the shrinkable sheeting supply device introduces the shrinkable sheeting in sliding manner on a shrinkable sheeting guide arrangement which is connnected to the gantry and extends in the direction of advance of the conveyor, nd that the elements for welding together and severing the web of shrinkable sheeting sliding over this guide arrangement and hanging down at its side portions from the said arrangement, press the portions thereof hanging down at both sides against one another before the welding and severing operation. Owing to the fact that the web of shrinkable sheeting is introduced in sliding manner on a guide arrangement, the longitudinal edge portions of the sheeting web hang down automatically at both sides of the pallet load and can thereupon be guided towards one another without difficulty in a lateral direction in order to weld them together.

DESCRIPTION OF THE DRAWINGS

In the accompanying drawings:

FIG. 1 shows a side view of a wrapping machine according to the invention,

FIG. 2 shows a plan view on to the wrapping machine,

DESCRIPTION OF THE INVENTION

Figure 4:
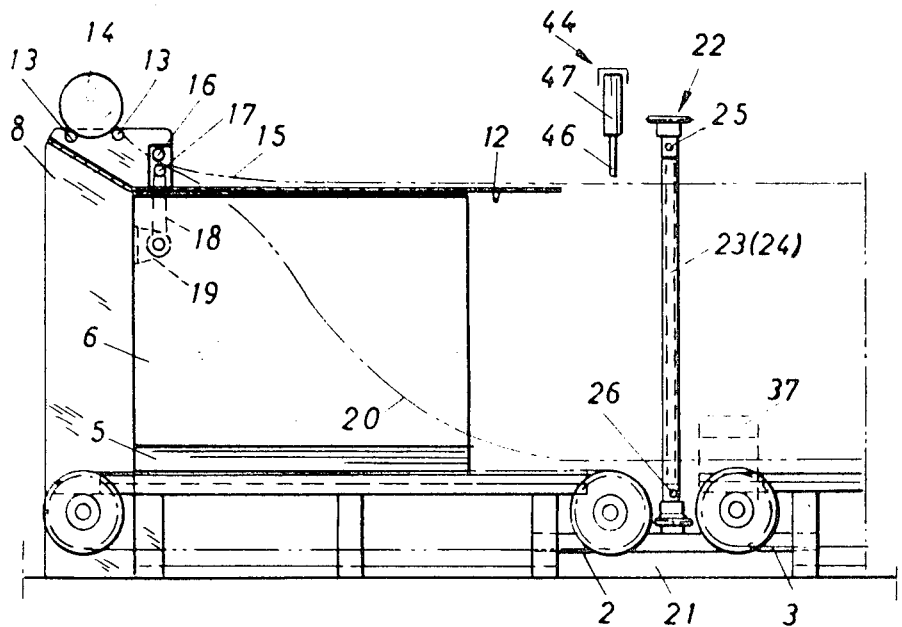
FIG. 4 shows on the same scale a side view of the same portion of the wrapping machine.

In the wrapping machine four conveyors 1, 2, 3, 4 are provided which are situated one behind the other and move loads 6 resting on load pallets 5 through the wrapping machine in the direction of the arrow 7 as shown in FIG. 1. At the inlet end of the conveyor 2 there is arranged a gantry 8 connected to a tunnel 9 which extends in the direction of conveyance 7 and whose side walls 10 narrow as viewed in the direction of conveyance and whose roof 11 is constructed with an extension 12 projecting beyond the front end of the sidewalls 10.

Above the gantry 8, and transversely to the direction of conveyance 7, there is mounted on supporting rollers 13 a supply roll 14 of shrinkable sheeting 15 which is conducted through between two feed rollers 16, 17 one of which, 17, is driven by a motor 19 by means of a chain or a driving belt 18. The width of the shrinkable sheeting 15 is so chosen that if the film is conducted forwards and over the extension 12, the side portions 20 of the web of shrinkable sheeting 15 hang down at both sides of the load 6 to be covered, and even extend as far as the lower edge of the load pallet 5.

Figure 8:
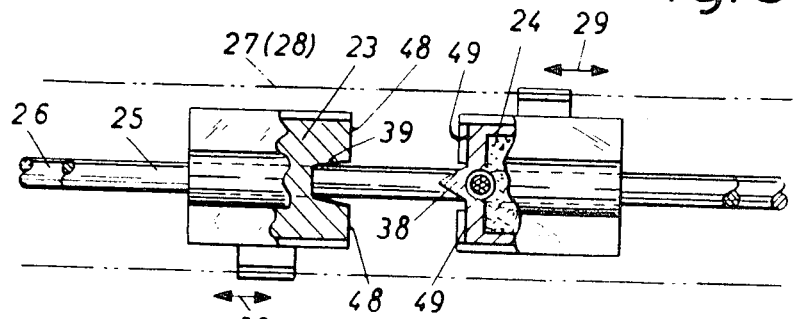
FIG. 8 is a plan view on a still larger scale on to the combined welding and severing device, the view being partly in horizontal section.

In an interval 21 between the two conveyors 2 and 3 there is arranged a combined welding and severing device 22. This consists of two welding jaws 23 and 24 which extend in the vertical direction and which are controlled both at their upper and at their lower end by horizontal rectilinear guides 25, 26 and moved by means of endless chains 27, 28 alternately towards and away from one another (see the double arrows 29, 30 in FIG. 8). The chains 27, 28 run over chain driving wheels 31, 32 and 33, 34 which are arranged on vertical shafts 35, 36 driven by a common driving motor 37. Of the welding jaws 23, 24, which incidentally are electrically heated, one welding jaw 24 is provided with a severing element 38 which when the two welding jaws are brought together engages in a vertical channel of the second welding jaw 23.

The conveyor 3 passes though an electrically heated shrinking tunnel 42 which is provided with air locks 40 and 41 and a fan 43.

Between the tunnel 9 and the combined welding and severing device 22 there is arranged a vertically acting pressure means for pressing-down the central portion 45 of the shrinkable sheeting 15 between its two side portions 20 before these are welded together. According to the form of embodiment illustrated in FIG. 1, this pressure means 44 consists of a piston 46 which is displaceable vertically in a hydraulic or pneumatic pressure cylinder 47.

The wrapping machine according to the invention operates in the following manner. It will be assumed that a first load pallet 5 with a load 6 resting on it has been conveyed up to the combined welding and severing device 22 and the shrinkable sheeting 15 has been advanced until its front end extends into the space between the two welding jaws 23, 24. After these have been brought together and the front end of the sheeting welded, and after the two welding jaws 23 and 24 have been returned to their initial position (FIG. 2) the wrapping machine is ready to start. The conveyor 2 then transfers the pallet 5 with its load 6 to the conveyor 3 and comes to a standstill in the position shown in FIG. 1, in which position the shrinkable sheeting from the supply roll 14 extends like a cover over the load 6 and between the two welding jaws 23, 24. By imparting an impulse to the pressure means 44, the piston 46 thereof presses the central portion 45 of the shrinkable sheeting downwards and in the form of a loop between the two side portions 20 of the film. Immediately afterwards, the electric motor 37 is started, whereby the two welding jaws 23, 24 are guided towards one another, the two side portions 20 being welded together and the weld region being severed in the vertical direction between the portions 48 and 49 of the two welding jaws 23, 24, where the actual welding takes place.

Figure 7:
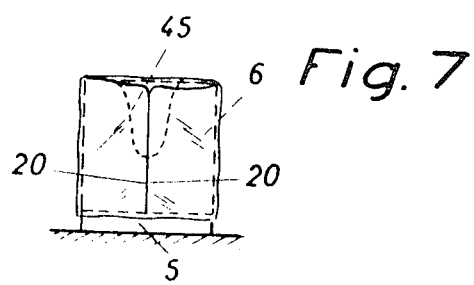
FIG. 7 is an end view of a pallet load already wrapped.
Figure 9:
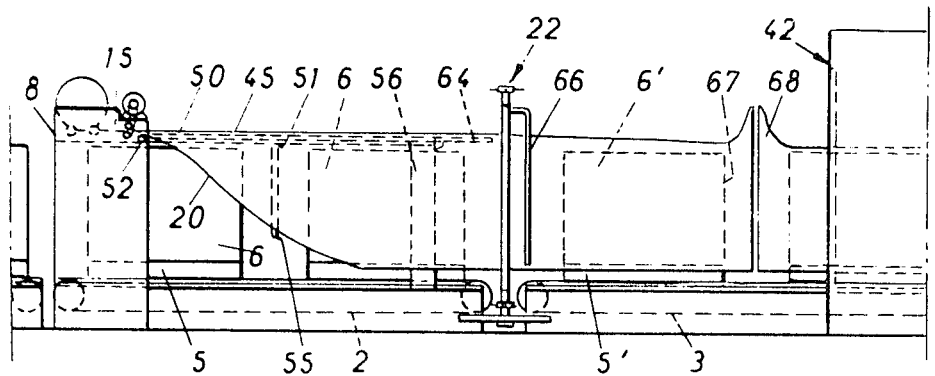
FIG. 9 shows a side view of a wrapping machine according to a further form of embodiment of the invention after a pallet load has passed the welding and severing device.
Figure 10:
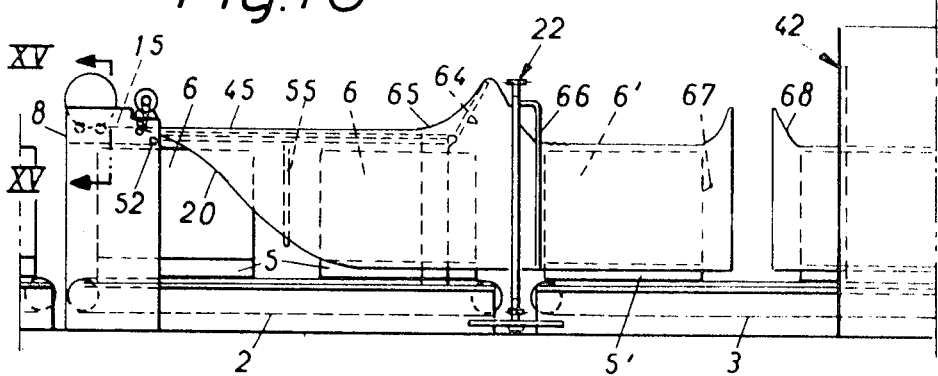
FIG. 10 shows a similar side view, with the pallet load in a slightly drawn-back position and with the upper portion of the sheeting somewhat raised.

Simultaneously with the conveying of a new pallet 5 bearing a load 6 through the tunnel 9 and up to immediately before the welding and severing device 22, the load 6 which has just been wrapped with shrinkable sheeting is conveyed into the heated shrinking tunnel 42 in which it remains standing until the shrinkable sheeting surrounding the load 6 and the sides of the pallet 5 has shrunk. Then the finished wrapped load with its pallet (see FIG. 7) is conveyed out of the shrinking tunnel and delivered to the conveyor 4 (FIG. 1).

Owing to the fact that the sidewalls 10 of the tunnel 9 end at a greater spacing than the extension 12 from the welding and severing device 22, it is guaranteed that detrimental tensile stresses which could prejudice the durability of the welded zone do not occur in the longitudinal sides of the sheeting web 15 when the latter is welded together.

In the wrapping machine, several electrical impulse elements are also provided for regulating the motors for the conveyors 1, 2, 3 and 4 of the feed device 16, 17 for the pressure means 44 and the welding and severing device 22. These impulse elements and the conduits leading to them have not been shown, in order to leave the drawings easier to read.

By using an air blast nozzle for pressing-down the central portion of the shrinkable sheeting between its two hanging side portions before these are welded together, a kind of hanging-down bag is formed in the sheeting after the heat treatment of the sheeting in the shrinking tunnel. But when a pallet load of this kind is dispatched, in rainy weather rain water readily collects in this bag, which tends to penetrate through the sheeting and wet the load situated therebelow. This disadvantage is obviated by a further development of the invention in that the conveyor for moving forwards a pallet load which has just been wrapped in shrinkable sheeting and has been taken past the welding and severing device, conveys the said load back over a predetermined distance in order to form a slack, tension-free portion in the sheeting between this pallet load and the pallet load following it, and in addition there is provided in the wrapping machine an element which slightly raises the upper region of the slack portion of shrinkable sheeting which has just arrived at the welding and severing device, before the welding and severing operation is carried out. As a result, upstanding end pieces are formed at the front end and at the rear end of the relevant pallet load in the shrinkable sheeting. During the subsequent shrinking operation, these end pieces fall down owing to their own dead weight as a result of the heating, and thus no baglike depressions which might encourage the collection of rain water are formed.

When wrapping high, wide pallet loads, for example having a height of about 2 meters and a width of about 1 meter, a web of shrinkable sheeting of not less than about 5 meters width is required. Unless special measures were taken here, the width of the wrapping machine would become very considerable. According to the invention it is proposed to use a web of shrinkable sheeting so wound that the sheeting supply roll is reduced to only half its former width by folding the longitudinal edges of the web inwardly under the central portion. The unrolling of a web of shrinkable sheeting of this kind, however, entails special requirements regarding the construction of the guide arrangement permitting the sheeting web to be fed and spread out over the pallet loads brought up on the conveyor, in order to ensure that the longitudinal edge portions of the sheeting web hang down at both sides of the pallet loads. According to one form of embodiment of the invention the guide arrangement consists of three tubes or the like extending from the inlet gantry of the wrapping machine in the direction of advance of the pallet loads, the center tube extending in the longitudinal axis direction of the wrapping machine and the two others at the two sides thereof. It is expedient to suspend from the two side tubes guide rods which spread out the longitudinal edge portions of the shrinkable sheeting. To facilitate the spreading-out of the sheeting web, according to the present invention it is also possible to use air nozzles which are adapted to be connected to a source of compressed air and which direct air jets obliquely outwardly against the underside of the shrinkable sheeting.

Figure 15:
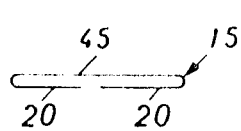
Figure 11:
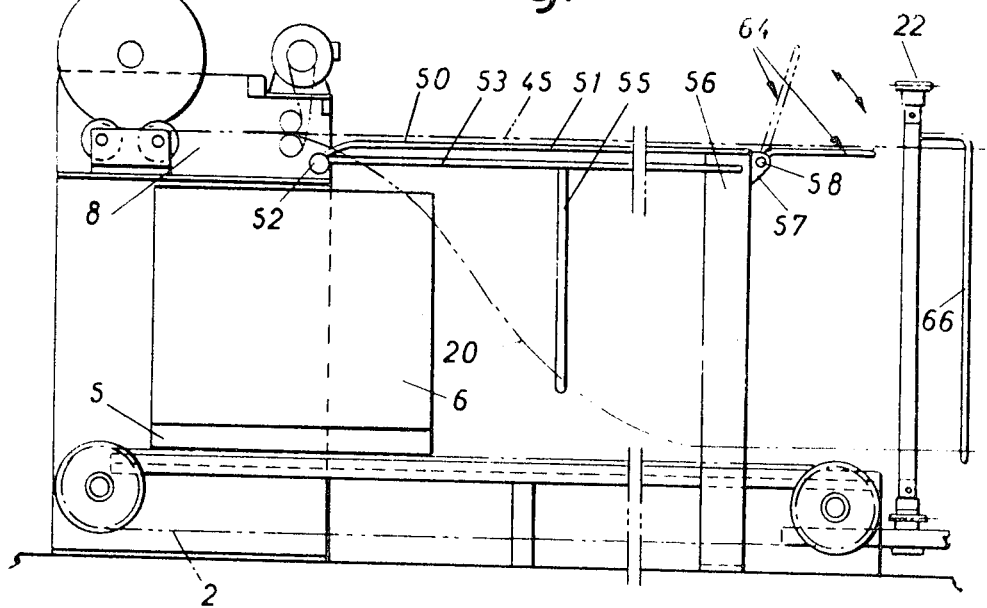
FIG. 11 shows on a somewhat larger scale a similar side view of the wrapping machine to FIG. 9.
Figure 12:
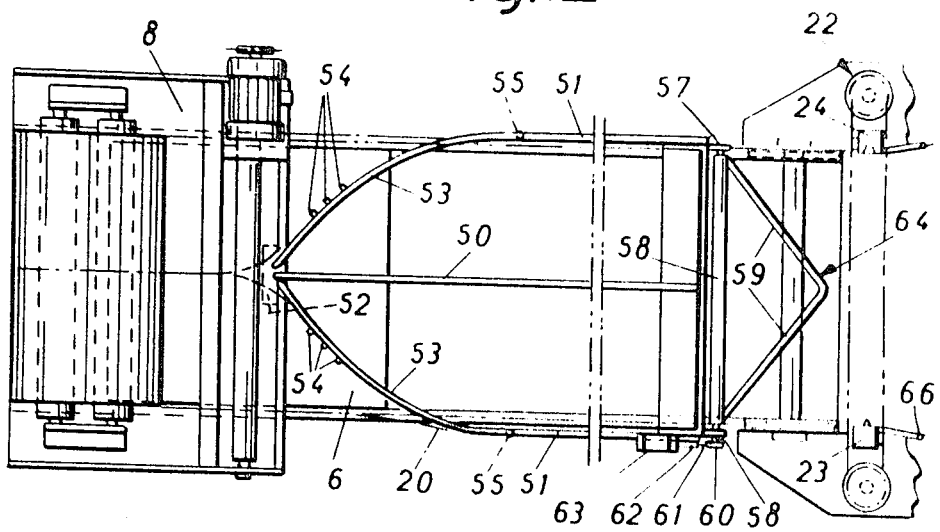
FIG. 12 shows a plan view on to this wrapping machine.

The guide arrangement for the shrinkable sheeting 15 which is illustrated in FIGS. 9—12 comprises a central tube 50 which extends from the gantry 8 forwards as viewed in the direction of advance of the load pallets 5, and which supports the central portion 45 of the shrinkable sheeting 15, and two side tubes 51 which extend arcuately from a transverse air distributor tube 52. The latter is connected to a source of compressed air (not shown). The arcuate portions 53 of the side tubes 51 are provided with air nozzles 54 or apertures for the discharge of air jets, which are directed obliquely outwards towards the underside of the central portion 45 of the sheeting, so that the longitudinal edge portions 20 (FIG. 15) are opened out downwardly in order to hang down at both sides of the pallet load 6 which is to be covered. In order to facilitate the spreading-out of the longitudinal edge portions 20 additionally, guide rods 55 are arranged which extend downwards from the two side tubes 51.

Figure 3:
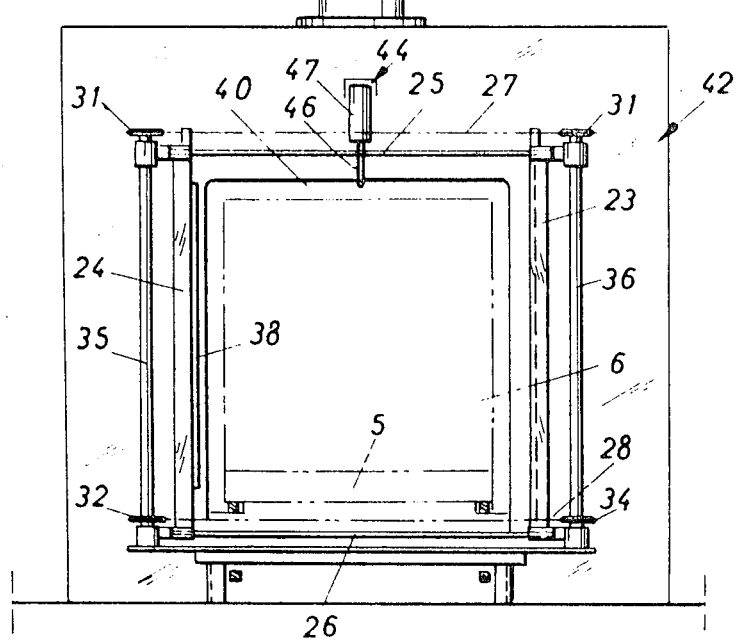
FIG. 3 is a vertical cross section on a larger scale taken on the line III-III in FIG. 1.

At the upper end of a second gantry 56 through which the conveyor 2 travels there is pivotably mounted at two horizontal bearings 57 a shaft 58 which forms the base of an isosceles triangle whose two equal sides 59 are formed of a bent tube. One end of the shaft 58 carries a wheel 60 about which a rope 61 is wound one end of which is secured to the wheel 60 and whose opposite end is fixed to a piston 62 which is adapted to be displaced axially in a compressed air cylinder 63 connected to a source of compressed air. As soon as the piston 62 is influenced by the air pressure and is moved into the compressed air cylinder 63, the triangular lifting element 64 is pivoted in the counterclockwise direction according to FIG. 3 from the position illustrated in full lines to the position illustrated in dot-dash lines, to be pivoted back to its horizontal initial position owing to its own dead weight (possibly assisted by spring force) when there is a pressure drop in the air cylinder 63.

Also provided in the wrapping machine are per se known means which, after the conveyance of a load pallet 5' with its load 6' past the welding and severing device 22, shift this pallet load backwards over a predetermined distance in order to form in the shrinkable sheeting 15 a slack, tension-free portion 65 between the pallet loads 5, 6 and 5', 6' situated at the two sides of the welding and severing device 22.

Figure 13:
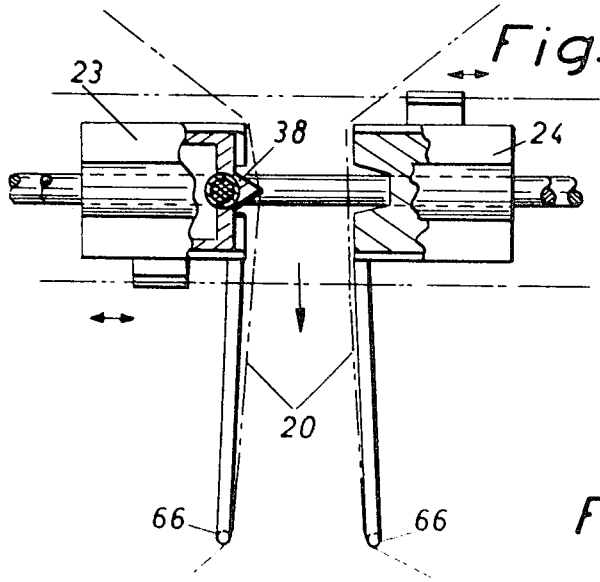
FIG. 13 shows a plan view, shown partly in horizontal cross section, on to the welding and severing device associated with this wrapping machine during the bringing-together of its two welding jaws.
Figure 14:
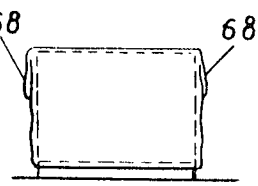
FIG. 14 is a side view showing a pallet load wrapped by means of shrinkable sheeting in this wrapping machine, after the shrinking operation has ended and, FIG. 15 shows a vertical section taken on the line XV-XV of FIG. 10 through the web of shrinkable sheeting just after leaving the supply roll.

As FIG. 13 shows, the two welding jaws 23, 24 are provided with rods 66 which start from their upper end and are directed downwardly and are situated at some distance from the said welding jaws. During the bringing-together of the two welding jaws 23, 24, these rods 66 force the two longitudinal edge portions 20 of the shrinkable sheeting 15 to extend in the main parallel to the vertical, mutually facing planes of the welding jaws.

Figure 6:
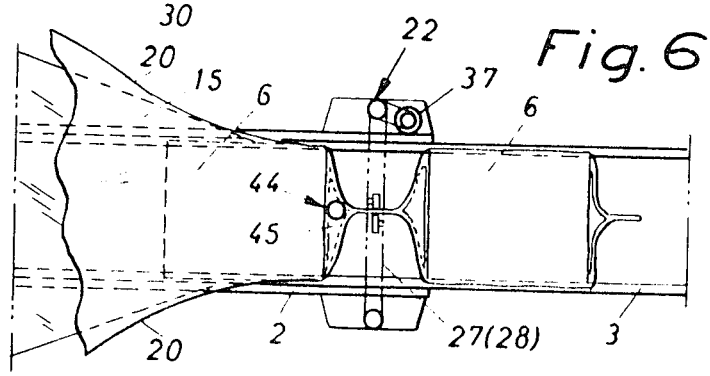
FIG. 6 is a plan view on to the welding device of the wrapping machine.
Figure 5:
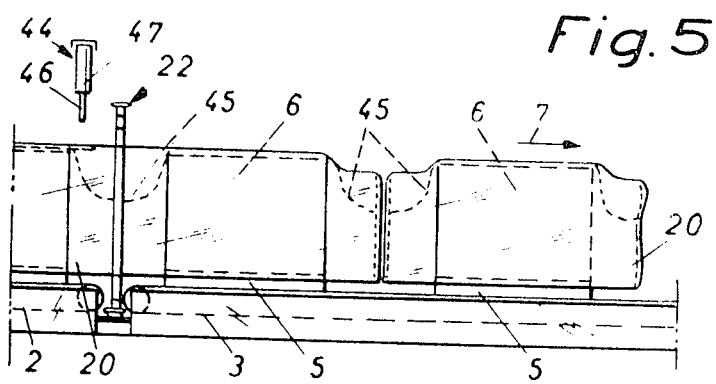
FIG. 5 shows on the same scale as in FIG. 1 a side view of the wrapping machine during the welding together of the side portions of the shrinkable sheeting.

The way in which pallet loads are wrapped will presumably be clear from the foregoing with reference to the drawings. After the feeding of the shrinkable sheeting in the direction forwardly and over the guide tubes 50, 51 with its longitudinal edge portions 20 depending at both sides of the pallet load 6', which during an operation which has already taken place has 6', already surrounded at its front end 67 (FIG. 9) with shrinkable sheeting, and has been taken past the welding and severing device 22 by the conveyor 3, the conveyor 3 is moved in the reverse sense for a predetermined distance—which is conveniently somewhat longer than half the width of the pallet load 6'—so that the web of shrinkable sheeting is provided with a slack, nontensioned portion in the immediate vicinity of the device 22. Before the two welding jaws 23, 24 press the two longitudinal edge portions 20 of the sheeting against one another, with subsequent severing by means of the severing element 38, the lifting element 64 is pivoted upwards and thereby forces the upper region of the slackened sheeting portion 65 upwards in order to form an end piece. After severing, the end piece 68 of the shrinkable sheeting retains the form given to it. Then when the pallet load which has thus been wrapped by means of the sheeting passes through the shrinking tunnel 42, this sheeting becomes soft as a result of heating, and the end pieces 68 bend and fall downwards owing to their dead weight as shown in FIG. 6.

The forms of embodiment illustrated and described can only be regarded as an example, and the various parts of the wrapping machine can be modified constructionally in various ways within the framework of the following claims. Fox example, the pressure means 44 can be replaced by an air nozzle which is connected to a source of compressed air and which at a given time presses the sheeting portion 45 downwards between the two side portions 20 of the sheeting by means of an air jet.

What we claim is:

1. Machine for wrapping loads in shrinkable sheeting, provided with a gantry having a conveyor travelling therethrough for conveying through the said gantry loads resting on load pallets, a device for feeding shrinkable sheeting from a supply roll in the longitudinal direction of the conveyor, a single sealing/severing means at a fixed location for welding together and severing the shrinkable sheeting material through the welding position and in the longitudinal direction thereof for forming an open-bottomed bag over the contents, and with a heated shrinking tunnel with a conveyor for conveying the load covered with shrinkable sheeting, and its associated load pallet, through the shrinking tunnel in order to shrink the sheeting laid about the load, wherein the improvement comprises a shrinkable sheeting feed device supplying the shrinkable sheeting in a sliding manner on a guide arrangement for the shrinkable sheeting which is connected to the gantry and extends in the direction of advance of the conveyor, and that the elements for welding together and severing the web of shrinkable sheeting sliding over this guide arrangement and hanging downwards with its side portion from this arrangement, press against one another the portions of the said web which hang downwards at both sides before the welding and severing operation is carried out and said guide arrangement is arranged after the gantry, said guide arrangement narrowing in the direction of advance and being provided with a roof, the said roof extending by means of an extension past the sidewalls of the guide arrangement.

2. Machine for wrapping pallet loads in shrinkable sheeting, provided with a gantry having a conveyor travelling therethrough for conveying through the said gantry loads resting on load pallets, a device for feeding shrinkable sheeting from a supply roll in the longitudinal direction of the conveyor, a single sealing/severing means at a fixed location for welding together and severing the shrinkable sheeting material through the welding position and in the longitudinal direction thereof for forming an open-bottomed bag over the contents, and with a heated shrinking tunnel with a conveyor for conveying the load covered with shrinkable sheeting, and its associated load pallet, through the shrinking tunnel in order to shrink the sheeting laid about the load, wherein the improvement comprises a shrinkable sheeting feed device supplying the shrinkable sheeting in a sliding manner on a guide arrangement for the shrinkable sheeting which is connected to the gantry and extends in the direction of advance of the conveyor, and that the elements for welding together and severing the web of shrinkable sheeting sliding over this guide arrangement and hanging downwards with its side portion from this arrangement, press against one another the portions of the said web which hang downwards at both sides before the welding and severing operation is carried out and said conveyor in order to form a slack, nontensioned portion in the shrinkable sheeting between the pallet load and the pallet load following this is reversible over a specific distance, there being also provided in the machine a means which slightly lifts the upper region of the slack shrinkable sheeting portion which has just arrived before the welding and severing device, before the welding and severing operation is carried out.

3. Machine according to claim 2, wherein the means for lifting the upper region of the slack shrinkable sheeting portion is in the form of an isosceles triangle, the base of which is mounted to be pivotable in horizontal bearings arranged at the machine frame.

4. Machine for wrapping pallet loads in shrinkable sheeting, provided with a gantry having a conveyor travelling therethrough for conveying through the said gantry loads resting on load pallets, a device for feeding shrinkable sheeting from a supply roll in the longitudinal direction of the conveyor, a single sealing/severing means at a fixed location for welding together and severing the shrinkable sheeting material through the welding position and in the longitudinal direction thereof for forming an open-bottomed bag over the contents, and with a heated shrinking tunnel with a conveyor for conveying the load covered with shrinkable sheeting, and its associated load pallet, through the shrinking tunnel in order to shrink the sheeting laid about the load, wherein the improvement comprises a shrinkable sheeting feed device supplying the shrinkable sheeting in a sliding manner on a guide arrangement for the shrinkable sheeting which is connected to the gantry and extends in the direction of advance of the conveyor, and that the elements for welding together and severing the web of shrinkable sheeting sliding over this guide arrangement and hanging downwards with its side portion from this arrangement, press against one another the portions of the said web which hang downwards at both sides before the welding and severing operation is carried out, said guide arrangement for the shrinkable sheeting comprising three tubes or the like which extend from the gantry in the direction of advance of the pallet loads, and of which the central tube extends in the longitudinal axis direction of the machine and the two other tubes at both sides thereof.

5. Machine according to claim 4, wherein the improvement comprises guide rods which hang down from the side tubes.

6. Machine according to claim 4 wherein the improvement comprises shaping the side tubes closed at their free end and providing them with nozzles or the like which are adapted to be connected to a source of compressed air and which direct air jets obliquely outwardly against the underside of the shrinkable sheeting.